United States Patent Office 3,432,661
Patented Mar. 11, 1969

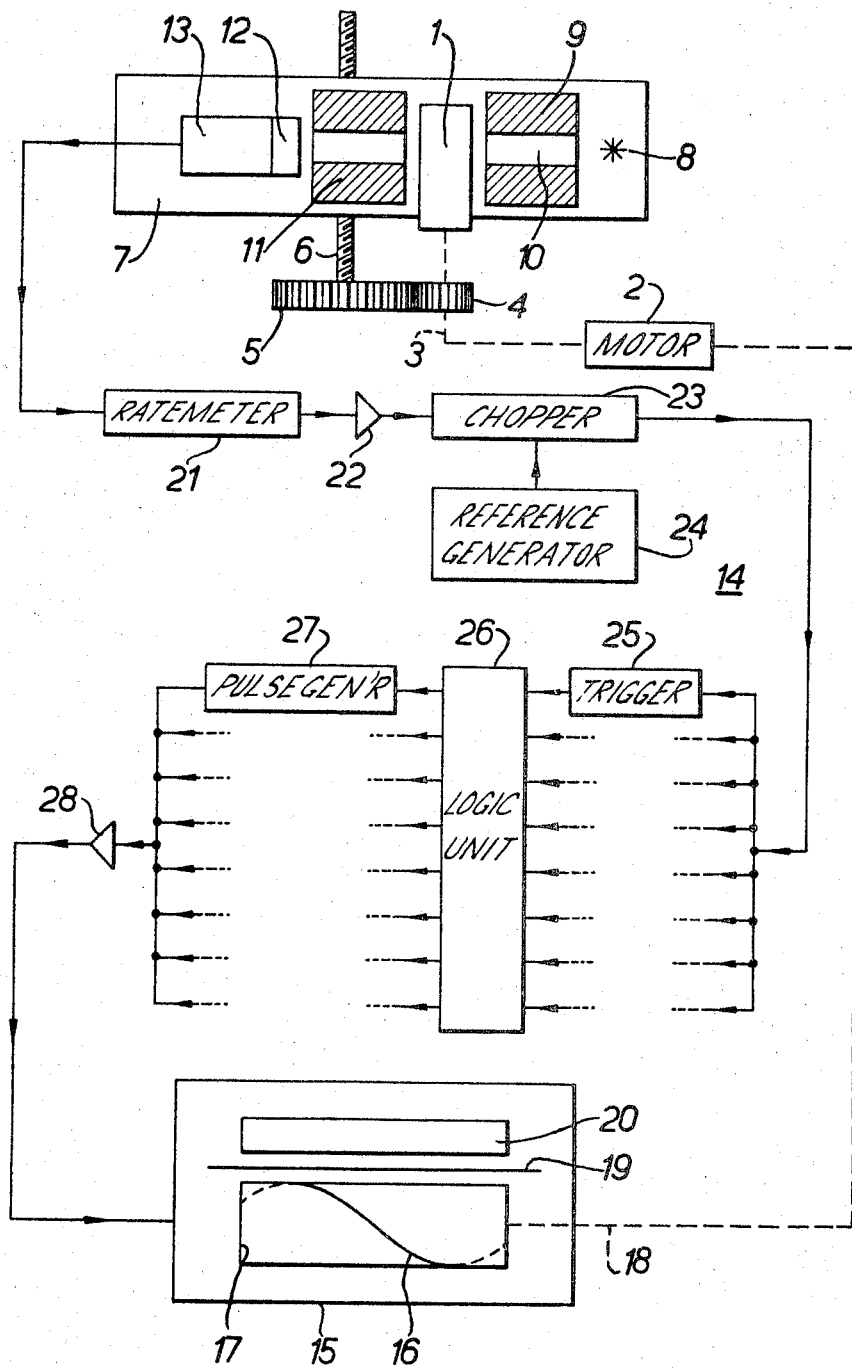

3,432,661
APPARATUS FOR EXAMINING THE INTERNAL STRUCTURE OF A BODY
William Lloyd Hodgkinson, Abingdon, England, assignor to United Kingdom Atomic Energy Authority, London, England
Filed Mar. 4, 1965, Ser. No. 437,182
Claims priority, application Great Britain, Mar. 11, 1964, 10,187/64
U.S. Cl. 250—83.3    8 Claims
Int. Cl. G01t 1/16

ABSTRACT OF THE DISCLOSURE

In apparatus for examining the internal structure of a body an electric signal is derived in dependence on alpha, beta, gamma or some other radiation passing through the body. This signal is supplied to a facsimile recorder to produce a pictorial representation by way of an amplifier which quantises the signal into two or more predetermined amplitudes. Instead of having a continuous variation of tone therefore the representation has a discrete number of different tones.

---

This invention relates to apparatus for examining the internal structure of a body.

According to the present invention, apparatus for examining the internal structure of a body comprises means to derive an electric signal which varies in dependence upon certain characteristics of the internal structure of the body and a facsimile recorder to which the signal is supplied so as to produce a pictorial representation of variations in said characteristics, wherein said derived signal is supplied to the facsimile recorder by way of an electric amplifier arrangement which supplies to the facsimile recorder signals of any one of a discrete number of fixed amplitudes, said number exceeding two, each of said amplitudes corresponding to a range of amplitudes in said derived signal, whereby the pictorial representation is made up of a discrete number of tones corresponding to the number of fixed amplitudes.

Apparatus for examining the internal structure of a body, the apparatus being in accordance with the present invention will now be described by way of example with reference to the accompanying drawing, which shows the apparatus largely in block schematic form.

The apparatus includes means to derive a signal which is fed to a facsimile recorder having a pen arranged to move relative to the paper in synchronism with the scanning of the body. The derived signal therefore modulates the trace made by the pen of the recorder so as to produce a pattern of light and dark patches which will correspond to variations in the characteristic of interest.

The derived signal may, for example, vary in dependence upon the alpha, beta, gamma or X-rays, or ultrasound, reaching it from a source of the appropriate kind which scans the opposite side of the body in synchronism with the receiver. Alternatively, the derived signal may vary in dependence upon a radiation originating from the body itself, or in dependence upon eddy currents set up in the body.

For the purposes of the present description it will be assumed that the X-ray method is used, and that the body to be examined is a fuel element for a nuclear reactor.

Referring now to the drawing, the fuel element 1 is mounted for rotational movement supplied by a motor 2 via a shaft 3. The shaft 3 also drives a cog wheel 4 which meshes with a further cog wheel 5 driving a threaded shaft 6. The shaft 6 causes a carriage 7 to be translated axially of the fuel element 1.

An X-ray source 8 is mounted on the carriage 7, the beam of X-rays from the source 8 being collimated by a lead absorber 9 which has a narrow bore 10 arranged to be diametral of the fuel element 1, and the emerging beam is collimated by a similar absorber 11. The beam emerging from the absorber 11 falls on a scintillator crystal 12 which is coupled to a photomultiplier 13. The elements 8 to 13 are all mounted on the carriage 7.

The output from the photomultiplier 13 is supplied by way of an amplifier arrangement 14 to a recorder 15. The preferred form of the recorder 15 is the four inch recorder manufactured by Muirhead and Co. Ltd. of Great Britain and sold under the Registered Trademark "Mufax." The recorder 15 comprises a pen in the form of a wire 16 wound helically so as to form a single turn around a drum 17 of length four inches. The drum 17 is rotated by a shaft 18 from the motor 2 so as to make a complete revolution in synchronism with a revolution of the fuel element 1. A length of sensitive paper 19 passes over the drum 17 and beneath a fixed strip electrode 20 so that, as the drum 17 rotates, the wire 16 is effectively moved across the paper 19 at a known rate and with substantially zero return time. Electric current passing between the wire 16 and the electrode 20 makes a mark on the paper 19, which is advanced by a separate mechanism.

The output of the photomultiplier 13 is supplied to a ratemeter arrangement 21 and thence to an amplifier 22 having variable gain and bias. The output of the amplifier 22, which is a direct current signal the instantaneous amplitude of which varies in dependence upon the internal structure of the fuel element 1, is supplied to a chopper 23. The chopper 23 is a linear diode gate which is controlled by a reference generator 24 so as to pass the incoming signal for an interval of 8 microseconds in every 800 microseconds.

(In some alternative arrangements the ratemeter 21, and hence the amplifier 22, supplies a pulse output, in which case the reference generator 24 is synchronised with the pulses from the ratemeter 21.)

The pulse output of the chopper 23 is supplied to eight Schmidt trigger circuits 25 which are generally similar but are arranged to be triggered by pulses of sequentially increasing amplitude. Thus a low amplitude pulse may trigger only the first trigger circuit 25, but a larger amplitude pulse may, say, trigger the first five trigger circuits 25. On being triggered each trigger circuit 25 supplies an output to a logic unit 26 for a few hundred microseconds and then returns to its original condition before the next pulse from the chopper 23.

The logic unit 26 includes a junction transistor to the emitter and base electrodes of which the outputs of the first and second trigger circuits 25, respectively, are supplied by way of differentiating networks. The arrangement is such that if an output is supplied from the first trigger circuit 25 only, a pulse is developed at the emitter electrode and is supplied to an associated pulse generator 27, whereas if outputs are supplied from the first and second trigger circuits 25, substantially no signal is developed at the emitter electrode of the transistor.

The logic unit 26 includes seven other similar arrangements to which the outputs of the second and third trigger circuits 25, the third and fourth trigger circuits 25, etc., are supplied, and each of these transistors has an associated pulse generator 27. The operation is such that for any given amplitude of pulse supplied to the trigger circuits 25 a predetermined number of them will supply an output to the logic unit 26. The logic unit 26 will then supply an output pulse to only one of the pulse generators 27, the number of the pulse generator 27 to which the pulse is supplied increasing sequentially with the amplitude of the pulse supplied to the trigger circuits 25.

Each of the pulse generators 27 supplies a pulse of 800 microseconds duration when supplied with a pulse from the logic unit 26. The amplitude of the pulses supplied by each of the pulse generators 27 is variable, and these amplitudes may, for example, be preset so that the pulse amplitude increases sequentially with the number of the pulse generator 27. These pulses are supplied by way of a direct current amplifier 28 to the recorder 15.

The effect of the amplifier arrangement 14 is therefore to supply to the recorder 15 signals of any one of eight amplitudes, each of these amplitudes corresponding to a range of amplitudes of the signal supplied by the ratemeter arrangement 21. The eight amplitudes may together cover the whole expected range of amplitudes of the signal supplied by the rate meter arrangement 21, and the values of the eight amplitudes will be such that they result respectively in white, six graded grey tones, and black on the pictorial representation. In certain circumstances, for example where a reasonably accurate quantitative assessment of the variations in a characteristic is to be made, a representation of the kind given by the present arrangement is most informative and a considerable improvement over a representation having a continuous tonal range.

It is not of course essential that the number of amplitudes be eight, and any number which exceeds two may be used.

Again it is not essential that the amplitudes of the pulses supplied by the pulse generator 27 be preset so that they increase sequentially with the number of the pulse generator 27, or that each corresponds to an equal range of amplitudes of the signal supplied by the ratemeter arrangement 21. In fact the amplitudes of the pulses supplied by the pulse generators 27 may be preset to give almost any desired relation between the pulse amplitudes and the amplitude of the signal supplied by the ratemeter arrangement 21. In this way the pictorial representation can be made to show the information of interest to best advantage.

A particular example is where one or more of the pulse amplitudes are preset to correspond to a narrow range of amplitudes of the signal supplied by the ratemeter arrangement 21, in which case a contouring effect is achieved.

I claim:

1. Apparatus for examining the internal structure of a body comprising, means for deriving an electric signal, the value of which varies over a given range in dependence upon certain characteristics of the internal structure of the body, an electric amplifier arrangement and facsimile recorder, said derived signal being supplied through the amplifier to the facsimile recorder to produce a pictorial representation of variations of said characteristics, said amplifier arrangement including a means for receiving, at any given instant, a derived signal having any one of a plurality of values within the said given range of values, means for sensing different portions of said given range and a means for supplying an output signal of any one of a discrete number of different fixed amplitudes, said number exceeding two, the amplitude of the output signal being supplied at any given moment corresponding to the portion of the said given range of the derived signal being supplied to the amplifier arrangement, whereby the pictorial representation is made up of a discrete number of tones corresponding to the number of fixed amplitudes.

2. Apparatus in accordance with claim 1 wherein said amplifier arrangement comprises means for producing from said derived signal a pulse signal in which the amplitudes of the pulses correspond to said discrete number of fixed amplitudes.

3. Apparatus for examining the internal structure of a body, comprising means for deriving an electric signal which varies in dependence upon certain characteristics of the internal structure of the body, an electric amplifier arrangement and a facsimile recorder, wherein said derived electric signal is supplied to the facsimile recorder to produce a pictorial representation of variations in said characteristics by way of said electric amplifier arrangement, said amplifier arrangement including means for supplying to the facsimile recorder signals of any one of a predetermined discrete number of fixed amplitudes, said number exceeding two, each of said amplitudes corresponding to a range of amplitudes in said derived signal supplied to the amplifier arrangement, whereby the pictorial representation is made up of a discrete number of tones corresponding to the number of fixed amplitudes, wherein said amplifier arrangement comprises means for sampling the amplitude of said derived signal at regularly recurrent intervals, a series of trigger circuits to all of which each of said samples is supplied, each trigger circuit in the series being arranged to be triggered by a sample of larger amplitude than the preceding trigger circuit in the series, and means for supplying to the facsimile recorder a pulse of a fixed amplitude in response to each said sample, the amplitude of the pulse being predetermined in dependence upon the number of said trigger circuit triggered by said sample.

4. Apparatus in accordance with claim 1 wherein said number is in the range four to ten inclusive.

5. Apparatus for examining the internal structure of a body, comprising a radiation detector means for scanning the body to detect radiation emerging from the body and for supplying an output electric signal in dependence upon the level of said radiation and hence in dependence upon certain characteristics of the interval structure of the body, a facsimile recorder including two co-operating electrodes between which sensitised paper is arranged to be passed, the paper being sensitised such that on an electric current passing between said electrodes the portion of the paper between said electrodes is darkened, and means for moving said electrodes relative to said paper such that said portion scans said paper, means for passing an electric current between said electrodes in dependence upon the output signal from said detector, and means for driving the facsimile recorder in synchronism with the scanning of the body so as to produce on said paper a pictorial representation of the body, wherein said output signal is supplied to the facsimile recorder by way of an electric amplifier arrangement which causes the electric current which passes between said electrodes to have any one of a predetermined discrete number of fixed amplitudes, said number exceeding two, each of said amplitudes corresponding to a range of amplitudes in said output signal, whereby the pictorial representation is made up of a discrete number of tones corresponding to the number of fixed amplitudes.

6. Apparatus in accordance with claim 5 wherein said amplifier arrangement comprises means for producing from said output signal a pulse signal in which the amplitudes of the pulses correspond to said discrete number of fixed amplitudes.

7. Apparatus in accordance with claim 5 wherein said amplifier arrangement comprises means for sampling the amplitude of said output signal at regularly recurrent intervals, a series of trigger circuits to all of which each of said samples is supplied, each trigger circuit in the series being arranged to be triggered by a sample of larger amplitude than the preceding trigger circuit in the series, and means for supplying to the facsimile recorder a pulse of a fixed amplitude in response to each said sample, the amplitude of the pulse being predetermined in dependence upon the number of said trigger circuit triggered by said sample.

8. Apparatus in accordance with claim 5, wherein said number is in the range four to ten inclusive.

References Cited

UNITED STATES PATENTS

| | | | |
|---|---|---|---|
| 3,106,640 | 10/1963 | Oldendorf | 250—83.3 |
| 3,136,892 | 6/1964 | Willett et al. | 250—83.3 |
| 3,233,037 | 2/1966 | Foll | 178—5 |
| 3,240,871 | 3/1966 | La Rue | 178—5 |
| 3,159,744 | 12/1964 | Stickney et al. | 250—71.5 |

ARCHIE R. BORCHELT, *Primary Eaminer.*

U.S. Cl. X.R.

178—5; 250—71.5